United States Patent [19]

Adams et al.

[11] Patent Number: 4,944,489
[45] Date of Patent: Jul. 31, 1990

[54] ROTARY VALVE AND SEAL

[75] Inventors: Horst H. Adams; Bernd Brüggestrath, both of Bochum; Rudolf A. Kappe, Marl, all of Fed. Rep. of Germany

[73] Assignee: Gebruder Adams Armaturen U. Apparate GmbH & Co., K.G., Fed. Rep. of Germany

[21] Appl. No.: 392,247

[22] Filed: Aug. 10, 1989

[51] Int. Cl.⁵ .............................................. F16K 1/22
[52] U.S. Cl. ................................. 251/306; 251/174; 251/314
[58] Field of Search ............... 251/171, 173, 174, 306, 251/315, 314

[56] References Cited

U.S. PATENT DOCUMENTS

| | | |
|---|---|---|
| 3,025,035 | 3/1962 | Swain . |
| 3,260,502 | 7/1966 | Plumer ................................ 251/306 |
| 3,442,488 | 5/1969 | Adams . |
| 3,532,321 | 10/1970 | Bowman . |
| 3,612,483 | 10/1971 | Pool ................................ 251/315 X |
| 3,620,242 | 11/1971 | Pease . |
| 3,749,115 | 7/1973 | Raftis . |
| 3,905,577 | 9/1975 | Karpenko . |
| 4,003,394 | 1/1977 | Adams . |
| 4,114,856 | 9/1978 | MacAfee . |
| 4,231,546 | 11/1980 | Eggleston . |
| 4,241,895 | 12/1980 | Sternenberg . |
| 4,271,858 | 6/1981 | Snape et al. ................... 251/306 X |
| 4,281,817 | 8/1981 | Adams . |
| 4,303,249 | 12/1981 | Illy ................................ 251/306 X |
| 4,491,298 | 1/1985 | Beauchamp et al. ............ 251/306 |
| 4,527,773 | 7/1985 | Muller et al. ................... 251/306 |
| 4,770,393 | 9/1988 | Hubertson . |
| 4,796,857 | 1/1989 | Hayes . |

FOREIGN PATENT DOCUMENTS 2396907  2/1979  France .

*Primary Examiner*—John C. Fox
*Attorney, Agent, or Firm*—Townsend and Townsend

[57] ABSTRACT

A rotary valve assembly having a housing, a valve member and a seal assembly. The seal assembly has at least one seal subassembly with two resilient sealing elements, each having a substantially linear section and a curved section formed integrally with the linear section. The linear and curved sections of the two sealing elements are disposed adjacent each other. The two resilient sealing elements may have different resiliency characteristics.

18 Claims, 3 Drawing Sheets

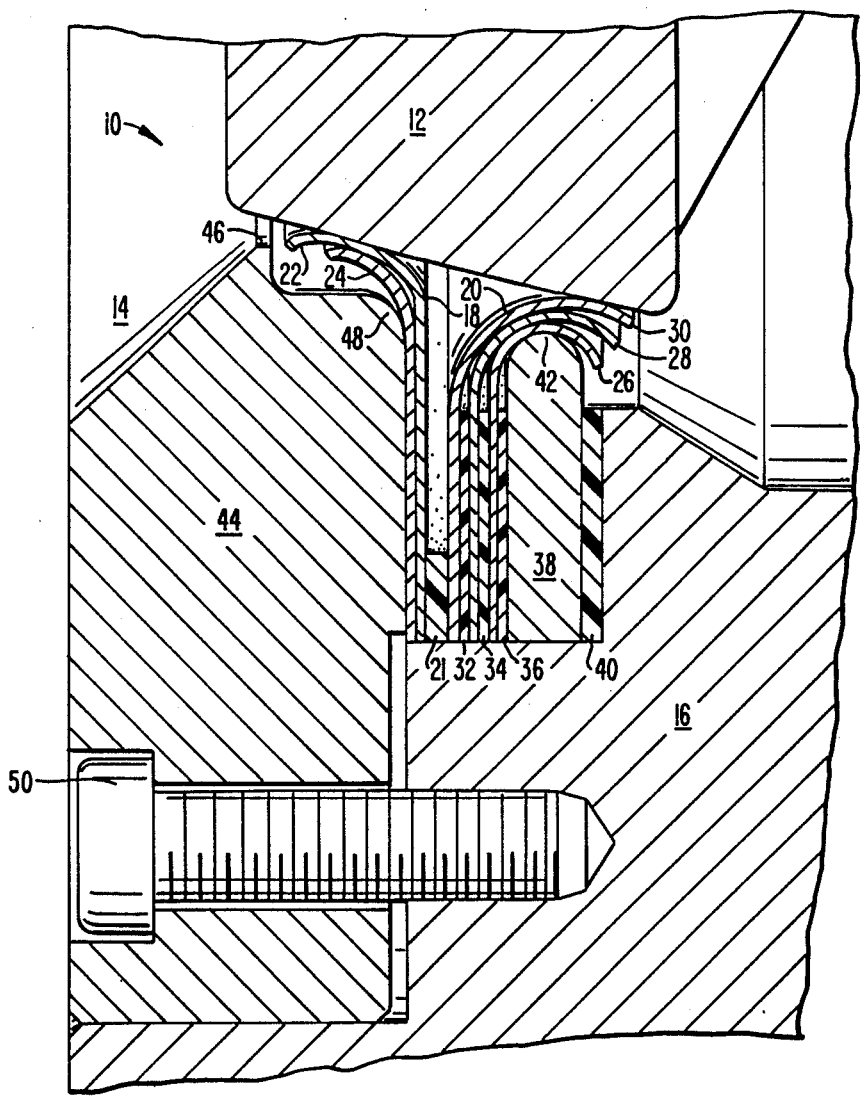
FIG._1.

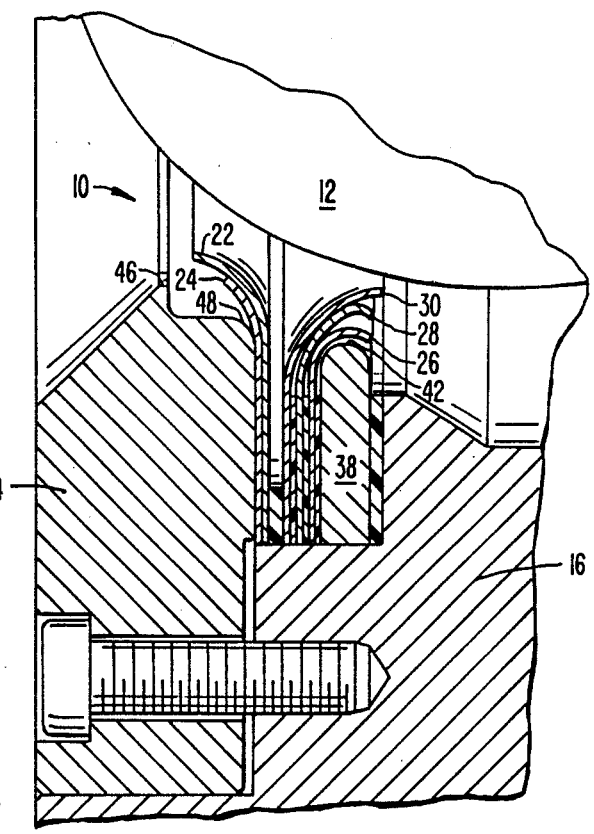
FIG._2A.
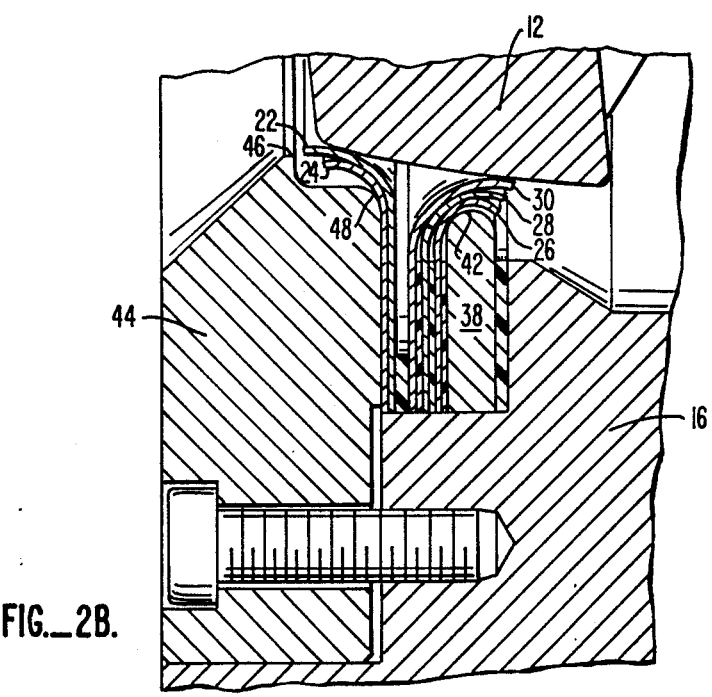
FIG._2B.

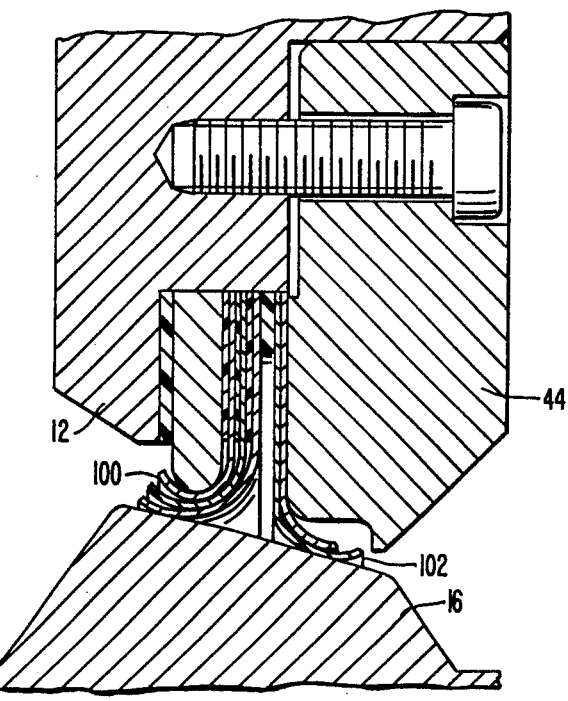
FIG._3.
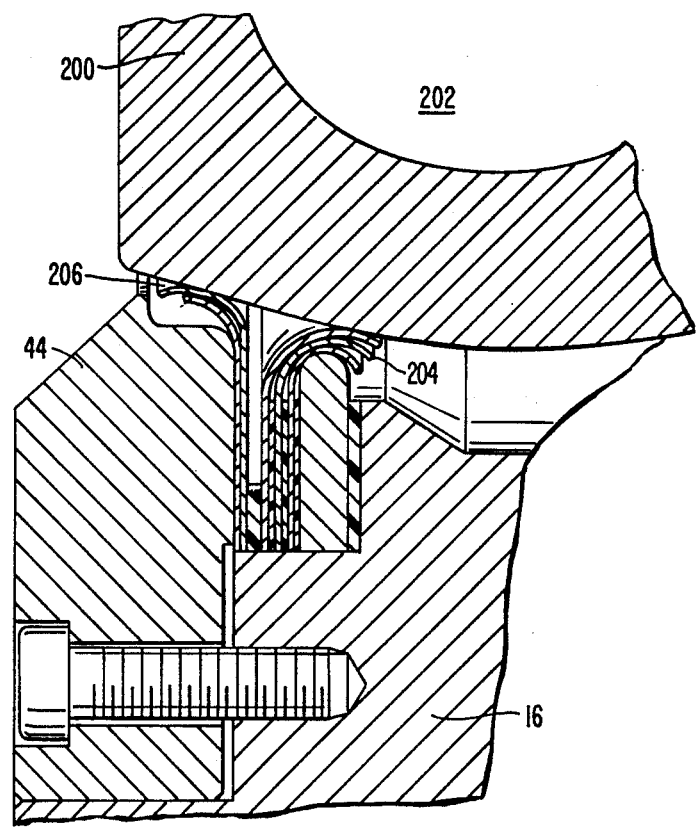
FIG._4.

ROTARY VALVE AND SEAL

BACKGROUND OF THE INVENTION

This invention relates to rotary valves and, in particular, to seals for bidirectional rotary valves.

Valve seal design is dictated by the use to which the valve will be put. Parameters controlling the choice of rotary valve seal include: the mean fluid pressure and pressure range; the mean fluid flow rate and flow rate range; the torque requirements for actuating the valve; the maximum permissible leakage rate; and whether the fluid flow will be unidirectional or bidirectional. The prior art is replete with valve seals designed to meet different ranges and combinations of these parameters.

One particular type of rotary valve seal is a resilient sealing element mounted in the valve body by a retaining ring. The sealing element typically has a straight outer periphery mounted between the retaining ring and the valve body and a curved portion which contacts the valve member. Examples of this type of seal are shown by U.S. Pat. No. 4,796,857 to Hayes et al.; U.S. Pat. No. 4,491,298 to Beauchamp et al.; U.S. Pat. No. 4,241,895 to Sternenberg et al.; and U.S. Pat. No. 4,231,546 to Eggleston et al. The disclosures of these patents are incorporated herein by reference.

SUMMARY OF THE INVENTION

This invention is drawn to a resilient sealing element type rotary valve seal. The seal has a first subassembly having a resilient sealing element having a substantially linear section and a curved section formed integrally with the linear section. The resiliency characteristics of the subassembly may be changed to meet the requirements of the valve's application. The seal subassembly may optionally have an additional resilient sealing element or elements. In addition, the seal may have a second seal subassembly similar to the first but oppositely disposed so that the valve provides effective sealing in either flow direction.

The invention is described more particularly below with reference to the drawings.

BRIEF DESCRIPTION OF THE DRAWINGS

FIG. 1 is a partial sectional view of a disc valve and seal according to this invention in its fully closed position.

FIG. 2A is a partial sectional view of a disc valve and seal according to this invention in its fully open position.

FIG. 2B is a partial sectional view of a disc valve and seal according to this invention in partially closed position.

FIG. 3 is a partial sectional view of a disc valve and seal according to this invention with the seal assemblies mounted on the valve disc.

FIG. 4 is a partial sectional view of a ball valve and seal according to this invention in a fully closed position.

DETAILED DESCRIPTION OF THE PREFERRED EMBODIMENT

FIG. 1 shows the preferred embodiment of this invention as used in a disc valve. The disc valve 10 has a valve disc 12 and a seal assembly 14 mounted in a housing 16. Disc 12 may be attached to a valve stem and an actuator in housing 16 as disclosed in U.S. Pat. No. 4,231,546 or in any other manner known in the art.

The configuration of seal assembly 14 may be changed to meet the operational parameters of the valve environment. In the configuration shown in FIG. 1, seal assembly 14 has two resilient subassemblies 18 and 20 separated by a resilient gasket 21. Subassembly 18 has two resilient rings 22 and 24, each having a substantially linear section and a curved section formed integrally with the linear section. Preferably, rings 22 and 24 have different resiliency characteristics due to differing radii of curvature, differing material, differing thickness, or any combination thereof. As shown in FIG. 1, for example, ring 22 has a greater radius of curvature than ring 24. Thus, the resiliency characteristics of ring 22 differ from the resiliency characteristics of ring 24.

Preferably, rings 22 and 24 are made from a metal, such as stainless steel. Rings 22 and 24 may be coated with a plastic coating to promote relative movement between the rings. Gasket 21 is preferably made of graphite but may also be made from an elastomeric material suitable for the fluid medium being controlled by valve 10.

As configured in FIG. 1, subassembly 20 has three resilient rings 26, 28 and 30 separated by annular gaskets 32 and 34. As with rings 22 and 24, rings 26–30 preferably have different resiliency characteristics due to differing radii of curvature, differing material, differing thickness, or any combination thereof. As shown in FIG. 1, for example, ring 30 has a greater radius of curvature than ring 28. Likewise, ring 28 has a greater radius of curvature than ring 26. Thus, the rings each have different resiliency characteristics.

Preferably, rings 26–30 are made from a metal, such as stainless steel. The rings may be coated with a plastic coating to promote relative movement between them. Gaskets 32 and 34 are preferably made of graphite but may also be made from an elastomeric material suitable for the fluid medium being controlled by valve 10.

A gasket 36, a support ring 38 and another gasket 40 separate seal subassembly 20 from valve body 16. Gaskets 36 and 40 may be made of graphite or any other suitable material. Support ring 38 has a rounded inner periphery 42 which has a radius of curvature less than the radius of curvature of seal ring 26. Seal ring 26 rests on inner periphery 42 when the valve disc 12 is in the closed position shown in FIG. 1.

Seal assemblies 18 and 20, support ring 38 and the associated gaskets are mounted on the valve body 16 by a retaining ring 44. Retaining ring 44 has an annular lip 46 and a rounded shoulder 48 on its inner periphery. Retaining ring is attached to valve body 16 by screws 50 or by any other means known in the art.

The open position of valve 10 is shown in FIG. 2A. Rings 22, 24, 26, 28 and 30 are in their fully extended positions. As the valve starts to close, the outer periphery of valve disc 12 begins to push rings 22 and 30 radially outward as shown in FIG. 2B. Ring 22, in turn, pushes ring 24 radially outward, ring 30 pushes ring 28 radially outward, and ring 28 pushes ring 26 radially outward. As they move radially outward, rings 22, 24, 26, 28 and 30 slide against each other. Rings 22 and 24 pivot about shoulder 48 of retaining ring 44, and rings 26–30 pivot about support ring 38. Rings 22–30 move to the positions shown in FIG. 1 when the valve is in its closed position.

The combined spring action of rings 22 and 24 provide a fluid-tight seal against valve disc 12. If seal assembly 18 is on the upstream side of valve disc 12, then the fluid pressure against rings 22 and 24 add to the sealing force of rings 22 and 24. Likewise, the combined spring action of rings 26-30 also provide a fluid-tight seal against valve disc 12. If seal assembly 20 is on the upstream side of valve disc 12, then the fluid pressure against rings 26-30 add to the sealing force of rings 26-30. Thus, valve 10 is bidirectional since the seal assembly 14 provides a fluid tight seal irrespective of the fluid flow direction.

The valve seal design of this invention permits modification of the seal elements to accommodate the required fluid flow parameters. As discussed above, the resiliency characteristics of the seal subassembly rings 22-30 may be changed to provide for more or less sealing force against valve disc 12. In addition, the number of seal rings used in the seal subassemblies 18 and 20 may be changed. In fact, one of the two seal subassemblies may be omitted entirely if the valve will be used to control fluid flowing in only one direction and if the pressure and maximum leakage parameters permit use of only one seal subassembly. The thickness of the seal assembly 14 may be kept within its designed limits by changing the thickness and/or number of gaskets in the seal assembly to accommodate changes in the thickness and/or number of seal rings.

While the above discussion of the preferred embodiment shows the seals disposed in the disc valve body, the seal assembly of this invention may also be mounted on the disc itself, as shown generally in FIG. 3. Examples of this general disc seal arrangement are shown in U.S. Pat. No. 3,442,488 to Adams; U.S. Pat. No. 3,532,321 to Bowman et al.; U.S. Pat. No. 3,905,577 to Karpenko; and U.S. Pat. No. 4,003,394 to Adams. The disclosures of these patents are incorporated herein by reference. The disc may have a single seal assembly on its periphery or two oppositely disposed seal assemblies 100 and 102 as shown in FIG. 3. As with the seal assembly discussed above, the number, thickness and radius of curvature of the seal rings may be changed to satisfy the fluid flow parameters.

It will also be apparent to those skilled in the art that this seal design may be used with ball valves and other rotary valves as well. As with the disc valve seal assemblies discussed above, the number, thickness and radius of curvature of the seal rings may be changed to satisfy the fluid flow parameters. In addition, one of the two seal subassemblies may be omitted entirely if the valve will be used to control fluid flowing in only one direction and if the pressure and maximum leakage parameters permit use of only one seal subassembly.

An example of the use of the seal of this invention in a ball valve is shown in FIG. 4. Ball valve member 200 is shown in its closed position wherein the fluid passageway 202 is turned perpendicularly to the direction of fluid flow. Seal assemblies 204 and 206 are mounted in valve body 16 by retaining ring 44.

Other changes and modifications will be apparent to those skilled in this art. These changes and modifications may be made without departing from the scope of this invention.

What is claimed is:

1. A rotary valve assembly including a housing, a valve member and a seal assembly, the seal assembly comprising:
   a first resilient seal subassembly having a resilient sealing element, the sealing element having a substantially linear section and a curved section formed integrally with the linear section;
   means for changing the resiliency of the first resilient seal subassembly, the means for changing comprising a second resilient sealing element having a substantially linear section and a curved section formed integrally with linear section, the linear and curved sections of the second resilient sealing element being disposed adjacent linear and curved sections of the first resilient sealing element, the second resilient sealing element having different resiliency characteristics then the first resilient sealing element, and the first seal subassembly further comprising an annular gasket disposed between the first resilient sealing element and the second resilient sealing element; and
   means for mounting the seal subassembly in the valve assembly.

2. The assembly of claim 1 wherein the second resilient sealing element has a cross-section which differs in shape from the cross section of the first resilient sealing element.

3. The assembly of claim 2 wherein the curved section of the second resilient sealing element has a radius of curvature which is smaller than the radius of curvature of the curved section of the first resilient sealing element.

4. The assembly of claim of claim 4 wherein the valve member is a disc valve.

5. The assembly of claim 6 wherein the means for mounting the seal assembly comprises means for attaching the seal assembly to the disc valve.

6. The assembly of claim 4 wherein the means for mounting the seal assembly comprises means for attaching the seal assembly to the housing.

7. The assembly of claim 5 wherein the valve member is a ball valve.

8. The assembly of claim 1 wherein the seal assembly further comprises a second resilient seal subassembly having a first resilient sealing element and means for changing the resiliency of the second resilient seal subassembly, the resilient sealing element having a substantially linear section and a curved section formed integrally with the linear section, and
   the means for changing comprising a second resilient sealing element in the second subassembly having a substantially linear section and a curved section formed integrally with the linear section, the linear and curved sections of the second resilient sealing element being disposed adjacent the linear and curved sections of the first resilient sealing element of the second resilient seal subassembly.

9. A rotary valve assembly including a housing, a valve member and a seal assembly, the seal assembly comprising:
   a first resilient seal subassembly having a resilient sealing element, a sealing element having a substantially linear section and a curved section formed integrally with the linear section;
   means for changing the resilience of the first resilient seal subassembly, the means for changing comprising a second resilient sealing element having a substantially linear section and a curved section formed integrally with a linear section, the linear and curved sections of the second resilient sealing element being disposed adjacent the linear and curved sections of the first resilient sealing element, the means for changing the resiliency of the first resilient seal subassembly further comprising a third resilient sealing element disposed adjacent the first and second resilient sealing elements; and means for mounting the seal subassembly in the valve assembly.

10. The assembly of claim 9 wherein the third resilient sealing element has different resiliency characteristics than the first and second resilient sealing elements.

11. The assembly of claim 10 wherein the third resilient sealing element has a radius of curvature which is smaller than the radius of curvature of the second resilient sealing element.

12. The assembly of claim 9 wherein the first resilient seal subassembly further comprises an annular gasket disposed between the second resilient sealing element and the third resilient sealing element.

13. A rotary valve assembly including a housing, a valve member and a seal assembly, the seal assembly comprising;
- a first resilient seal subassembly having a resilient sealing element, the sealing element having a substantially linear section and a curved section formed integrally with the linear section;
- means for changing the resiliency of the first resilient seal subassembly, the means for changing comprising a second resilient sealing element having a substantially linear section and a curved section formed integrally with the linear section, the linear and curved sections of the second resilient sealing element being disposed adjacent the linear and curved sections of the first resilient sealing element;
- a support ring disposed adjacent the first resilient seal subassembly for limiting the resilient movement of the resilient sealing elements of the first resilient seal subassembly;
- a second resilient seal subassembly having a first resilient sealing element, the resilient sealing element having a substantially linear section and a curved section formed integrally with the linear section;
- means for changing the resiliency of the second resilient seal subassembly, the means for changing comprising a second resilient sealing element in the second subassembly having a substantially linear section and a curved section formed integrally with the linear section, the linear and curved sections of the second resilient sealing element being disposed adjacent the linear and curved section of the first resilient sealing element of the second resilient seal subassembly; and
- means for mounting the seal subassembly in the valve assembly, the means for mounting the seal assembly comprising a retaining ring.

14. The assembly of claim 13 wherein the support ring has a curved support surface on its radially innermost perimeter, the support surface having a radius of curvature which is smaller than the radius of curvature of the first resilient sealing element of the first resilient seal subassembly.

15. A rotary valve assembly including a housing, a valve member and a seal assembly, the seal assembly comprising:
- a first resilient seal subassembly having a resilient sealing element, the sealing element having a substantially linear section and a curved section formed integrally with the linear section;
- means for changing the resiliency of the first resilient seal subassembly, the means for changing comprising a second resilient sealing element having a substantially linear section and a curved section formed integrally with the linear section, the linear and curved sections of the second resilient sealing element being disposed adjacent the linear and curved sections of the first resilient sealing element, the second resilient sealing element having different resiliency characteristics than the first resilient sealing element;
- a support ring disposed adjacent the first resilient seal subassembly for limiting the resilient movement of the resilient sealing elements of the first subassembly;
- a second resilient seal subassembly having a first resilient sealing element, the first resilient sealing element of the second subassembly having a substantially linear section and a curved section formed integrally with the linear section;
- means for changing the resiliency of the second resilient seal subassembly, the means for changing comprising a second resilient sealing element in the second subassembly having a substantially linear section and a curved section formed integrally with the linear section, the linear and curved sections of the second resilient sealing element being disposed adjacent to linear and curved sections of the first resilient sealing element, respectively; and
- means for mounting the first and second seal subassemblies in the valve assembly, the means for mounting the seal assembly comprising a retaining ring.

16. The assembly of claim 15 wherein the curved section of the second resilient sealing element of the first subassembly has a radius of curvature which is smaller than the radius of curvature of the curved section of the first resilient sealing element of the first subassembly, and the curved section of the second resilient sealing element of the second subassembly has a radius of curvature which is smaller than the radius of curvature of the curved section of the first resilient sealing element of the second subassembly.

17. The assembly of claim 15 wherein the support ring has a curved support surface on its radially innermost perimeter, the support surface having a radius of curvature which is smaller than the radius of curvature of the first resilient sealing element of the first resilient seal subassembly.

18. The assembly of claim 15 further comprising an annular gasket disposed between the first and second subassemblies.

* * * * *